United States Patent [19]

Hamada et al.

[11] Patent Number: 4,841,113
[45] Date of Patent: Jun. 20, 1989

[54] WELDING CONTROL APPARATUS AND METHOD

[75] Inventors: Akio Hamada; Gen Tsujii; Genzo Fuse; Masahide Kondo, all of Sayama, Japan

[73] Assignee: Honda Giken Kogyo Kabushiki Kaisha, Tokyo, Japan

[21] Appl. No.: 259,828

[22] Filed: Oct. 19, 1988

[30] Foreign Application Priority Data

Oct. 20, 1987 [JP] Japan .................................. 62-262623
Oct. 20, 1987 [JP] Japan .................................. 62-262625
Jan. 26, 1988 [JP] Japan .................................. 63-13699

[51] Int. Cl.$^4$ ............................................. B23K 11/24
[52] U.S. Cl. ................................. 219/110; 219/86.41; 219/117.1
[58] Field of Search .................. 219/86.41, 86.25, 110, 219/117.1

[56] References Cited

U.S. PATENT DOCUMENTS

| 4,296,304 | 10/1981 | Defourny | 219/86.41 |
| 4,694,135 | 9/1987 | Nagel et al. | 219/110 |
| 4,707,582 | 11/1987 | Beyer | 219/86.41 |

*Primary Examiner*—Clifford C. Shaw
*Attorney, Agent, or Firm*—Armstrong, Nikaido, Marmelstein, Kubovcik & Murray

[57] ABSTRACT

A welding control apparatus and a method for controlling thereof for automatic welding machines having a welding gun successively moved by a robot to a plurality of welding spots on a work object for welding is disclosed. The welding control apparatus and the method for controlling thereof detect any abnormal conditions for preventing damages to the gun or undesired occurrence of holes in the work object.

6 Claims, 3 Drawing Sheets

WELDING CONTROL APPARATUS AND METHOD

BACKGROUND OF THE INVENTION

1. Field of the Invention

This invention relates to a welding control method and a welding control apparatus for automatic welding machines in which a welding gun is successively moved by a robot to a plurality of welding spots on the work object for welding.

2. Description of Relevant Art

In conventional automatic welding machines, welding is done by operating the robot according to a teaching data to successively move the welding gun to welding spots where the welding gun is closed for clamping a work object between the electrode tips at the front ends of the gun arms. In this manner, current is applied to the electrode tips to weld the work object. After the welding is completed for all the welding spots, the welding gun is returned to a standby position and the welded work is removed and another work is set at a predetermined position. Then, the welding gun is moved again to the respective welding spots to repeat the welding process.

In the prior art, when the welding gun is moved to a welding spot and closed according to the teaching data even though a user has forgotten to set a work object in position or there is a missetting of a work object as a positioned deviation thereof, the electrode tips directly hit each other without a work object held therebetween or clamp the work object at other parts other than at the welding spot. Even in such abnormal conditions, the conventional welding machines are simply energized to perform welding, causing damages to the gun and making an undesired hole in the work.

SUMMARY OF THE INVENTION

In view of the above-mentioned problem, an object of this invention has for its object to provide a welding control method and a welding apparatus by which abnormal conditions are accurately detected for preventing damages to the gun or undesired occurrence of holes in the work object.

In accordance with an embodiment of this invention, the welding control method for the automatic welding machine in which the welding gun is successively moved by a robot to a plurality of welding spots on the work comprises the step of initially closing the welding gun without a work object held between its arms before actually applying welding to a first welding spot on the work so as to take as a reference opening degree the opening degree of the gun arm then observed. The method further comprises the steps of storing said reference opening degree and presetting each welding spot to a specific gun arm opening degree corresponding to the thicknesses of the work at that spot. Further, the method includes the steps of detecting the opening degree of the gun arms when the welding gun is closed at each welding spot on the work and determining the difference between the detected opening degree and the reference opening degree; and then comparing this opening difference with the preset opening degree to determine whether there is any abnormal condition.

When the opening degree of the gun arms with the welding gun closed at each welding spot on the work object is smaller than the reference opening, a signal indicating the dislocation of an electrode tip is outputted.

The reference opening degree is the opening degree of the gun arms when the electrode tips contact each other leaving no distance between the tips. The difference between the detected opening degree of the gun arms when the welding gun is closed at each welding spot and the reference opening degree correctly represents the opening degree between the electrode tips when the welding gun is closed to clamp the work between the gun arms. Thus, when the electrode tips clamp the work at a correct welding spot, the preset opening degree for the welding spot should be equal to the opening difference. This means that by comparing the opening difference and the preset opening, it is possible to correctly determine whether there is any abnormal conditions.

There are times when the electrode tips become fused with the work object and come off from the gun arms when the gun is opened. In such cases, the opening degree which is detected when the welding gun is closed at the next welding spot will be smaller than the reference opening, in which case an abnormality signal representing the dislocation of the electrode tips is outputted so that corrective measures may be timely and accurately taken.

The foregoing and other objects, features and advantages of this invention will be apparent from the following, more particular, description of the preferred embodiments of this invention, as illustrated in the accompanying drawings.

DESCRIPTION OF PREFERRED EMBODIMENTS

Figure 1:
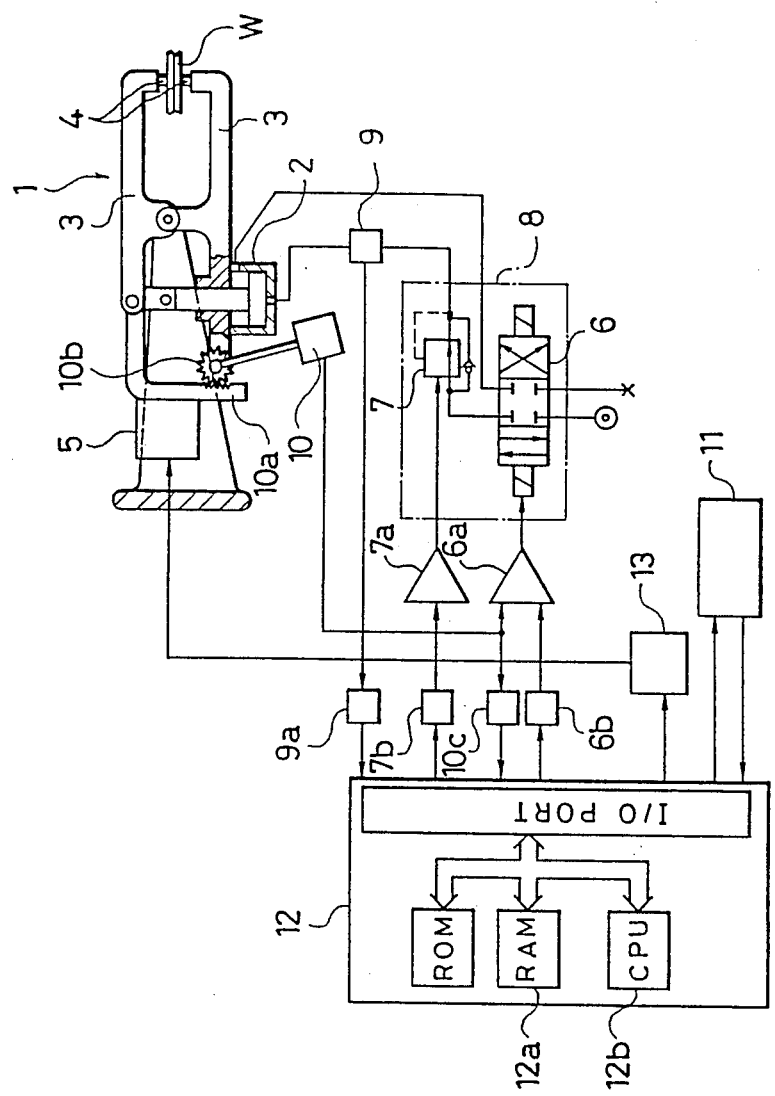
FIG. 1 is a schematic diagram showing one example embodiment of this invention.

Referring now to FIG. 1, reference numeral 1 represents an X-type welding gun having a pair of gun arms 3 which are opened and closed by a pressure cylinder 2. The welding gun 1 is moved successively to a plurality of welding spots on the work object W by a robot (not shown). At each welding spot, the gun arms 3 are closed to grip the work object W between the electrode tips 4 mounted at the front ends of the arms and then tighten the grip by pressure.

The electrode tips 4 are energized through a welding transformer 5 to perform spot welding on the work W.

The pressure cylinder 2 has a double acting air cylinder which is controlled by a pneumatic pressure servo circuit 8 equipped with a servo valve 6 controlled by a servo amplifier 7a. A pressure sensor 9 is provided with the pressure cylinder 2 to detect the clamping or welding pressure of the welding gun 1 from the pressure in one of the air chambers of the pressure cylinder 2 which is pressurized when the gun arms are closed. The welding gun 1 is further provided with an opening degree sensor 10 which detects the opening degree of the gun arms 3 from the rotating angle of a pinion 10b on one of the gun arms 3 that is in mesh with a rack 10a coupled to the other gun arm 3.

Reference numeral 11 is a robot controller and reference number 12 represents a gun controller which comprises a microcomputer. A RAM (random access memory) 12a of the controller 12 contains welding condition data for each welding spot, which include a welding current and a welding time, welding pressure, preset opening degree ($\theta$s) corresponding to the thickness of the work W at a welding spot, and an after-welding release opening degree of the gun arms 3.

Figure 2:
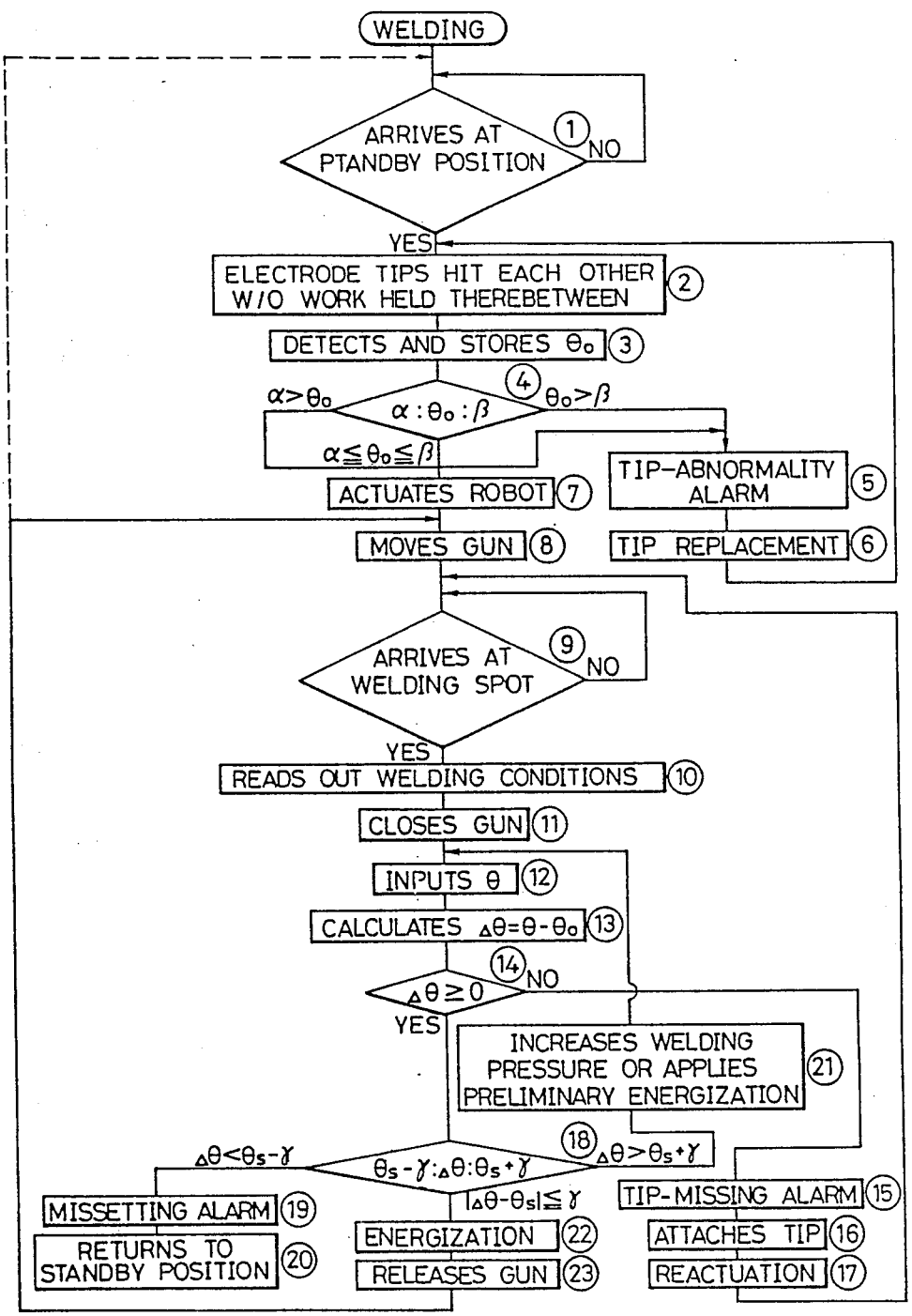
FIG. 2 is a flowchart showing the control program for the welding gun.
Figure 3A:
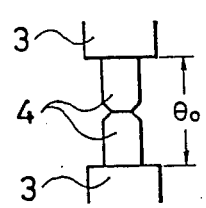
FIGS. 3(a) through 3(e) are schematic drawings showing the opening of the gun arms during arc-striking with no clamped work object, or during normal condition or abnormal condition.
Figure 3B:
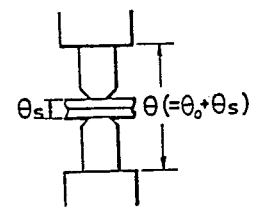

The welding gun 1 is controlled according to the program shown in FIG. 2. As illustrated in FIG. 2, when it is confirmed from a signal from the robot controller 11 that the welding gun 1 has arrived at the standby position (step 1), a pressurization instruction signal is outputted from the gun controller 12 to the servo-amplifier 6a through a D/A converter 6b. This causes the pressurized air to be supplied to the pressure cylinder 2, thus closing the gun arms 3 so as to have their tips contact each other with no work held therebetween as shown in FIG. 3(a) (step 2). At this time, the opening degree $\theta$ of the gun arms 3 as detected by the opening degree sensor 10 is inputted through an A/D converter 10c into the gun controller 12 where it is stored as a reference opening degree ($\theta$o) in the RAM 12a (step 3).

The reference opening degree $\theta$o changes according to the length of the electrode tips 4. From $\theta$o it is possible to know the extent of wear of the electrode tips 4. An allowable range for $\theta$o is set and it is checked whether $\theta$o is within the allowable range (step 4). When it is found that the length of the electrode tips 4 has decreased to the lowest utility limit and $\theta$o is smaller than the lower limit $\alpha$, or when $\theta$o is larger than the upper limit $\beta$ because the electrode tips 4 are nonconforming units so that they cannot be accurately inserted into the gun arms 3 or are too long, a tip-abnormal alarm is actuated (step 5), and then manual or automatic replacement of the electrode tips 4 is carried out (step 6). After the electrode tips 4 are replaced, the gun arms are closed without the work clamped therebetween to obtain and store $\theta$o and perform the check again to see if $\theta$o is within the allowable range.

When it is determined that $\theta$o is within the allowable range, the gun controller 12 outputs a preparation-complete signal to the robot controller 11. When said signal is outputted and the work is set, the robot is activated (step 7) to move the welding gun 1 according to the teaching data for the robot (step 8). Every time the welding gun 1 arrives at each welding spot on the work object, welding is performed as hereinafter described.

When it is confirmed from a signal from the robot controller 11 that the welding gun 1 has reached a welding spot (step 9), the welding condition data for that welding spot is read out (step 10). Then, the gun controller 12 outputs the pressurization instruction signal to the servo amplifier 6a through the D/A converter 6b and at the same time outputs the welding pressure setting signal to the drive amplifier 7a through the D/A converter 7b. In response to these signals, the servo valve 6 and the regulator 7 are operated to supply pressurized air to the pressure cylinder 2 and to close the welding gun 1 (step 11). When it is confirmed from a signal supplied from the pressure sensor 9 to the gun controller 12 through the A/D converter 9a that the pressure in the cylinder 2 has reached the preset level, the opening degree sensor 10 detects the opening degree $\theta$ of the gun arms 3 and inputs it through the A/D converter 10c to the gun controller 12 (step 12) where it is processed by the CPU 12b to calculate the difference $\Delta\theta$ between $\theta$ and $\theta$o (step 13).

Figure 3C:
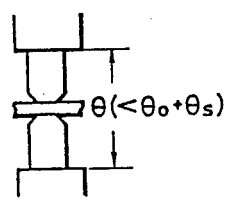
Figure 3D:
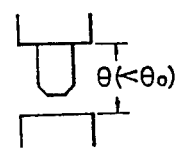
Figure 3E:
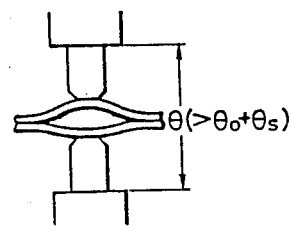

As indicated in FIG. 2, $\theta$ represents a valve consisting of $\theta$o plus the distance between the electrode tips 4, and therefore $\Delta\theta$ correctly signifies an opening degree between the electrode tips regardless of the length of the electrode tips 4. If the electrode tips 4 clamp the work object W therebetween at a correct welding point as shown in FIG. 3 (b), $\Delta\theta$ is equal to $\theta$s. However, if one forgets to set the work object W or the work object W is dislocated from the correct position so that the gun arms 3 clamp a non-overlapped part of the work object, as shown in FIG. 3(c), or if the gun arms 3 are closed without the work object W clamped therebetween, as shown in FIG. 3(a), $\Delta\theta$ is smaller than $\theta$s. When the electrode tip 4 is dislocated or missing, as shown in FIG. 3(d), $\Delta\theta$ will be a negative value. When the work alignment is incorrect, as shown in FIG. 3(e), $\Delta\theta$ is larger than $\theta$s.

After $\Delta\theta$ is calculated, it is first checked whether $\Delta\theta \geq 0$ (step 14). When it is determined that $\Delta\theta < 0$, a tip dislocation/missing alarm is actuated (step 15) for manually or automatically remounting the electrode tip 4 and operating of the welding gun is then resumed (step 16 and 17).

When it is found that $\Delta\theta \geq 0$, then comparison is made between $\Delta\theta$ and $\theta$s (step 18).

When $\Delta\theta < \theta$s $- \gamma$ ($\tau$ is an allowable error), a missetting alarm is actuated (step 19) so as to return the welding gun 1 to the standby position (step 20).

When $\Delta\theta > \theta$s $+ \gamma$, a welding pressure increase signal from the gun controller 12 is inputted to the drive amplifier 7a to operate the regulator 7 so as to increase the supply pressure to the pressure cylinder 2, and consequently increasing the welding pressure of the welding gun 1 (step 21). This causes the work objects W to be pressed closer together than in the state shown in FIG. 3(e) with the result that the opening degree $\theta$ of the welding gun 1 gradually decreases until the work objects W are tightly held together. Then, when $\theta$s $- \gamma \leq \Delta\theta \leq \theta$s $+ \gamma$, i.e., $|\Delta\theta - \theta$s$| < \gamma$, the gun controller 12 outputs a signal to energize the transformer drive circuit 13 so as to energize the gun with a specified welding current for a specified period of welding time (step 22). After a specified holding time following completion of the welding time, the after welding release opening degree setting signal from the gun controller 12 is inputted through the D/A converter 6b to the servo amplifier 6a which operates the servo valve 6 to open the gun arm 3 to the set opening degree (step 23). Then, the gun controller 12 sends a welding-complete signal to the robot controller 11 which operates the robot to move the welding gun 1 to the next welding spot.

As shown in FIG. 3 (e), when high current is applied while the work objects W are incorrectly aligned, poor welding with a large amount of sputters and undesired holes in the work object occur. On the other hand, according to the method of this invention, the welding pressure is increased so as to press the work objects W tightly together and the welding current is applied to the work objects in that condition so that no such problem occurs.

Instead of increasing the welding pressure, welding gun 1 may be preliminarily energized at Step 21 with current smaller than the specified welding current. This heats up and softens the work objects W to such an extent that the work objects may be easily pressed close together even without increasing the welding pressure.

The release opening degree of the welding gun 1 is set to a minimum opening required to prevent interference by the work object W and the minimum opening is determined according to the shape of the work object W in transit from one welding spot to the next.

Figure 4:
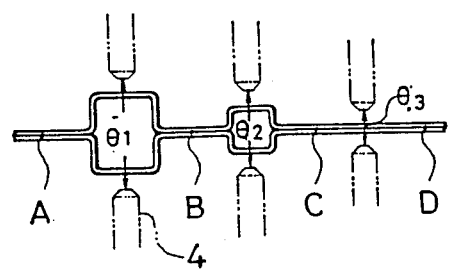
FIG. 4 is schematic drawing showing the relationship between the opening degree of the welding gun and the shape of the work.

As an example, when the work object W as shown in FIG. 4 is to be welded at spots A, B, C and D, in that order, the release openings of the gun at spots A, B and C are set at θ1, θ2 and θ3, respectively, so that the welding gun 1 need not be opened to any more than a necessary minimum before moving to the next welding process.

After welding at all spots is finished, the welding gun 1 is returned to the standby position to complete one cycle of welding operation.

According to this invention, the opening degree of the electrode tips can be accurately detected from the difference between a reference opening degree and a detected opening degree of the gun arms when the welding gun is closed. By comparing this opening difference with a preset opening degree which corresponds to the work object's thickness at a welding spot, it can be accurately checked whether the work is correctly clamped between the electrode tips. This prevents damages to the gun and/or undesired holes in the work object which can result from energization of the electrode tips of the gun under such abnormal conditions where no work object is clamped between the electrode tips.

The comparison between the detected opening degree and the reference opening degree makes it possible to detect dislocation or coming off of the electrode tip as easily distinguished from other abnormal conditions, so that a replacement tip can be installed without delay.

While the invention has been particularly shown and described in reference to preferred embodiments thereof, it will be understood by those skilled in the art that changes in form and details may be made therein without departing from the spirit and scope of the invention.

We claim:

1. A welding control method for automatic welding machines wherein a welding gun is successively moved by a robot to a plurality of welding spots on a work object whereby the welding gun is closed to firmly clamp the work object while applying pressure thereto and energized to perform welding, said welding control method comprising the steps of:
   closing the welding gun absent a work object clamped between the electrode tips prior to performing welding at a first welding spot on the work object for taking as a reference opening degree the then observed opening degree of the gun arms;
   storing said reference opening degree;
   presetting each welding spot at a specific opening degree of the gun arms which corresponds to the thickness of the work object at said welding spot;
   detecting the opening degree of the gun arms when the welding gun is closed at each welding spot on the work object;
   determining a difference between a detected opening degree and the reference opening degree; and thereafter
   comparing said opening difference with said preset opening degree for checking of any abnormal conditions.

2. The welding control method as in claim 1, wherein the step of determining a difference between the detected opening degree and the reference opening degree comprises the step of detecting whether the detected opening degree is smaller than the reference opening degree in order to output an abnormal condition signal indicating the coming off or absence of the electrode tip.

3. The welding control method as in claim 1, wherein the step of comparing said opening difference with said preset opening degree comprises the step of determining whether the opening difference is in the range above the preset opening degree so that the clamping of welding pressure of the welding gun is increased until the opening difference is leveled off to said preset opening degree so as to apply current to said welding gun for welding.

4. The welding control method as in claim 1, wherein the step of comparing said opening difference with said preset opening degree comprises the step of determining whether the opening difference is in the range above the preset opening degree in which case a preliminary energization using a smaller current than the welding current specified for each welding spot is applied until the opening difference is leveled off to the preset opening degree at which time the specified welding current is applied for regular welding.

5. A welding control apparatus, comprising:
   an opening degree detection means for detecting the opening degree of the gun arms of a welding gun;
   a first memory means for storing an opening degree which is detected by said opening degree detecting means when said welding gun is closed with the absence of a work object clamped between electrode tips of said welding gun;
   a second memory means for storing a preset opening degree for each welding spot for corresponding to the thickness of said work object;
   a calculation means for comparing an opening degree which is detected by said opening degree detection means when said welding gun is closed at each welding spot with said opening degree stored in said first memory means for calculating the difference between said opening degrees; and
   a check means for comparing said opening difference with said preset opening degree stored in said second memory means for determining the presence of any abnormal conditions.

6. The welding control apparatus as in claim 5, further comprising a means for outputting an abnormal condition signal which indicates the coming off or absence of said electrode tip when an opening degree of said gun arms which is detected for each welding spot on said work object during the welding gun closure is smaller than said opening degree stored in said first memory means.

* * * * *